(12) United States Patent
Shinoda et al.

(10) Patent No.: US 11,739,789 B2
(45) Date of Patent: Aug. 29, 2023

(54) HALF BEARING AND SLIDING BEARING

(71) Applicant: DAIDO METAL COMPANY LTD., Nagoya (JP)

(72) Inventors: Keisuke Shinoda, Inuyama (JP); Tomohiro Yamada, Inuyama (JP); Satoshi Kamiya, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/882,674

(22) Filed: Aug. 8, 2022

(65) Prior Publication Data
US 2023/0069203 A1  Mar. 2, 2023

(30) Foreign Application Priority Data
Aug. 24, 2021 (JP) ................................ 2021-135977

(51) Int. Cl.
*F16C 9/02* (2006.01)
*F16C 9/04* (2006.01)
(Continued)

(52) U.S. Cl.
CPC ............... *F16C 9/02* (2013.01); *F16C 3/14* (2013.01); *F16C 9/04* (2013.01); *F01M 11/02* (2013.01)

(58) Field of Classification Search
CPC .. F16C 9/02; F16C 9/04; F16C 17/022; F16C 33/1065; F16C 2360/22; F16C 3/14; F01M 11/02; F01M 2011/026
See application file for complete search history.

(56) References Cited

U.S. PATENT DOCUMENTS 6,227,709 B1  5/2001  Lehmann et al.
8,899,837 B2  12/2014  Kaneko et al.
(Continued)

FOREIGN PATENT DOCUMENTS

DE  10362115 B4  10/2007
JP  S59-50226 A  3/1984
(Continued)

OTHER PUBLICATIONS

Extended European Search Report dated Dec. 21, 2022 in counterpart foreign application No. EP 22188923.

*Primary Examiner* — Syed O Hasan
(74) *Attorney, Agent, or Firm* — Harness, Dickey & Pierce, P.L.C.

(57) ABSTRACT

Provided is a half bearing constituting a sliding bearing that is unlikely to cause damage during an operation of an internal combustion engine. The half bearing includes at least one protrusion, and the protrusion projects outward in a radial direction from an outer circumferential surface. A recessed portion that is recessed inward in the radial direction from the outer circumferential surface is formed over the entire inner-circumferential length between the protrusion and a circumferential-direction end surface of the half bearing. Two radial-direction grooves are formed in the circumferential-direction end surface of the half bearing relative to the protrusion, and each of the radial-direction grooves is adjacent to each of recessed portion side surfaces. The radial-direction grooves extend in the radial direction along the recessed portion side surfaces and are separated from the recessed portion at a midpoint of the extension. An inner circumferential surface-side end portion in an extending direction of the radial-direction grooves is located between a recessed portion bottom surface and an inner circumferential surface of the half bearing. A groove width and a groove depth of the radial-direction grooves decrease (Continued)

from the position separated from the recessed portion toward the inner circumferential surface-side end portion and reach zero at the inner circumferential surface-side end portion.

6 Claims, 8 Drawing Sheets

(51) Int. Cl.
    *F16C 3/14*     (2006.01)
    *F01M 11/02*     (2006.01)

(56) References Cited

U.S. PATENT DOCUMENTS

2011/0058761 A1* 3/2011 Ishigo .................. F16C 33/046
    384/288
2013/0343682 A1* 12/2013 Garnier ............... F16C 33/1065
    384/322

FOREIGN PATENT DOCUMENTS

| JP | H08-277831 A | 10/1996 |
|----|----|----|
| JP | 4746155 * | 8/2011 |
| JP | 2013-11333 A | 1/2013 |
| JP | 2019-190551 A | 10/2019 |

* cited by examiner

HALF BEARING AND SLIDING BEARING

INCORPORATION BY REFERENCE

The present application claims priority from JP Patent Application Ser. No. 2021-135977 filed on Aug. 24, 2021, the content of which is hereby incorporated by reference into this application.

BACKGROUND OF THE INVENTION

(1) Field of the Invention

The present invention relates to a half bearing constituting a sliding bearing that supports a crankshaft of an internal combustion engine. The present invention also relates to a sliding bearing with a cylindrical shape that includes the half bearing and supports a crankshaft of an internal combustion engine.

(2) Description of Related Art

A crankshaft of an internal combustion engine is supported at its journal portion by a cylinder block lower portion of the internal combustion engine via a main bearing constituted by a pair of half bearings. For the main bearing, a lubricant ejected by an oil pump is fed from an oil gallery formed in a cylinder block wall into a lubricant groove formed along an inner circumferential surface of the main bearing through a through-hole formed in a wall of the main bearing. Also, a first lubricant path is formed in a penetrating manner in a diameter direction of the journal portion, and openings at both ends of the first lubricant path communicate with the lubricant groove of the main bearing. Moreover, a second lubricant path passing through a crank arm portion is formed to be branched from the first lubricant path at the journal portion, and the second lubricant path communicates with a third lubricant path formed to penetrate in a diameter direction of a crank pin. In this manner, the lubricant fed from the oil gallery in the cylinder block wall into the lubricant groove formed in the inner circumferential surface of the main bearing through the through-hole passes through the first lubricant path, the second lubricant path, and the third lubricant path and is supplied from an ejection port opened at an end of the third lubricant path to a part between the crank pin and a sliding surface of a conrod bearing constituted by the pair of half bearings (see JP-A-8-277831, for example). The oil is supplied to a part between a surface of the crankshaft and the sliding surfaces of the main bearing and the conrod bearing.

The main bearing constituted by a pair of half bearings and the conrod bearing are held by a bearing holding hole with a cylindrical shape in a bearing housing. The bearing housing is constituted by a pair of housing split bodies, and each housing split body has a semi-cylindrical surface that forms the bearing holding hole when the housing split bodies are combined. The half bearings are held by the semi-cylindrical surfaces. The half bearings include protrusions projecting outward in the radial direction from outer circumferential surfaces near circumferential-direction end surfaces. Recessed portions with a rectangular sectional shape recessed inward in the radial direction from the outer circumferential surfaces are formed between the protrusions and the circumferential-direction end surfaces. The bearing holding hole (semi-cylindrical surface) of the housing split bodies include grooves (recessed portions) formed to extend in the circumferential direction from the circumferential-direction end portions of the semi-cylindrical surfaces. The half bearings are adapted to be disposed at a determined position in the axial direction in the bearing holding hole of the bearing housing by the protrusions of the half bearings being accommodated in the grooves of the bearing holding hole (see JP-A-59-50226, JP-A-2019-190551, and JP-A-2013-11333, for example).

Incidentally, internal combustion engines in recent years have a trend that rigidity of bearing housing portions such as conrods and engine blocks is degraded due to weight reduction for the purpose of low fuel consumption. Therefore, a phenomenon (close-in phenomenon) that a bearing holding hole with a cylindrical shape of a bearing housing repeats elastic deformation in which the inner diameter in the vertical direction becomes larger than the inner diameter in the horizontal direction and elastic deformation in which the bearing holding hole returns to the cylindrical shape due to an inertial force applied to the bearing housing and a dynamic load from a crankshaft during an operation of an internal combustion engine occurs (here, the horizontal direction indicates a direction connecting both split surfaces of housing split bodies of the bearing housing when seen in the axial direction of the bearing holding hole; Also, the vertical direction indicates a direction that perpendicularly intersects the direction connecting both split surfaces of the split-type bearing housing). When the inner diameter of the bearing holing hole of the bearing housing becomes larger in the vertical direction, a clearance may be instantaneously formed between split surfaces of a pair of housing split bodies of the bearing housing. When the split surfaces of the housing split bodies are brought into contact with each other again, circumferential-direction end surfaces of the half bearings, each of which is held by each housing split body, push each other, and a large load is applied near the circumferential-direction end surfaces of the half bearings.

In the half bearings in the related art with protrusions and recessed portions for positioning relative to the bearing housing as described in JP-A-59-50226, JP-A-2019-190551, and JP-A-2013-11333 above, damage (cracking) is likely to occur near the recessed portions of the circumferential-direction end surfaces due to the load applied to the circumferential-direction end surfaces of the half bearings when the close-in phenomenon occurs in the bearing housing during an operation of the internal combustion engine.

BRIEF SUMMARY OF THE INVENTION

An object of the present invention is to provide a half bearing constituting a sliding bearing of a crankshaft of an internal combustion engine that is unlikely to cause such damage during an operation of the internal combustion engine and a sliding bearing including the half bearing.

In order to solve the aforementioned problem, the present invention provides a half bearing constituting a sliding bearing that supports a crankshaft of an internal combustion engine, the half bearing having a semi-cylindrical shape and including an inner circumferential surface and an outer circumferential surface, the half bearing including: at least one protrusion, the protrusion projecting outward in a radial direction from the outer circumferential surface, in which a recessed portion recessed inward in the radial direction from the outer circumferential surface is formed over an entire circumferential-direction length between the protrusion and a circumferential-direction end surface of the half bearing, the protrusion is located between both end surfaces of the half bearing in an axial direction, the recessed portion includes a recessed portion bottom surface that is parallel with the axial direction of the half bearing when seen in a section that is parallel with the circumferential-direction end surface, two recessed portion side surfaces that perpendicularly intersect the axial direction of the half bearing at both ends of the recessed portion in the axial direction of the half bearing, and two recessed portion curved surfaces that connect the recessed portion side surfaces to the recessed portion bottom surface, two radial-direction grooves are formed in the circumferential-direction end surface of the half bearing relative to the protrusion, each of the two radial-direction grooves being adjacent to each of the recessed portion side surfaces, an extension length (L3) of the radial-direction grooves is greater than a depth (D1) of the recessed portion, the radial-direction grooves extend in the radial direction along the recessed portion side surfaces from the outer circumferential surface toward the inner circumferential surface of the half bearing, the radial-direction grooves being separated from the recessed portion at a midpoint of the extension, an inner circumferential surface-side end portion in an extending direction of the radial-direction grooves is located between the recessed portion bottom surface and the inner circumferential surface of the half bearing, and a groove width (W3) and a groove depth (D2) of the radial-direction grooves decrease from the position separated from the recessed portion toward the inner circumferential surface-side end portion and reach zero at the inner circumferential surface-side end portion.

In another embodiment of the present invention, the groove depth (D2) of the radial-direction grooves at the position separated from the recessed portion is 0.03 to 0.15 mm.

In another embodiment of the present invention, the groove width (W3) of the radial-direction grooves at the position separated from the recessed portion is 0.1 to 0.3 mm.

In another embodiment of the present invention, the extension length (L3) of the radial-direction grooves is greater than the depth (D1) of the recessed portion by 0.05 to 0.8 mm.

In another embodiment of the present invention, there is provided a sliding bearing with a cylindrical shape that supports a crankshaft of an internal combustion engine, the sliding bearing including: the aforementioned half bearing.

In another embodiment of the present invention, the sliding bearing is configured by a combination of pairs of the aforementioned half bearings.

DETAILED DESCRIPTION OF THE INVENTION

Hereinafter, specific examples of the present invention will be described with reference to the drawings.

Figure 1:
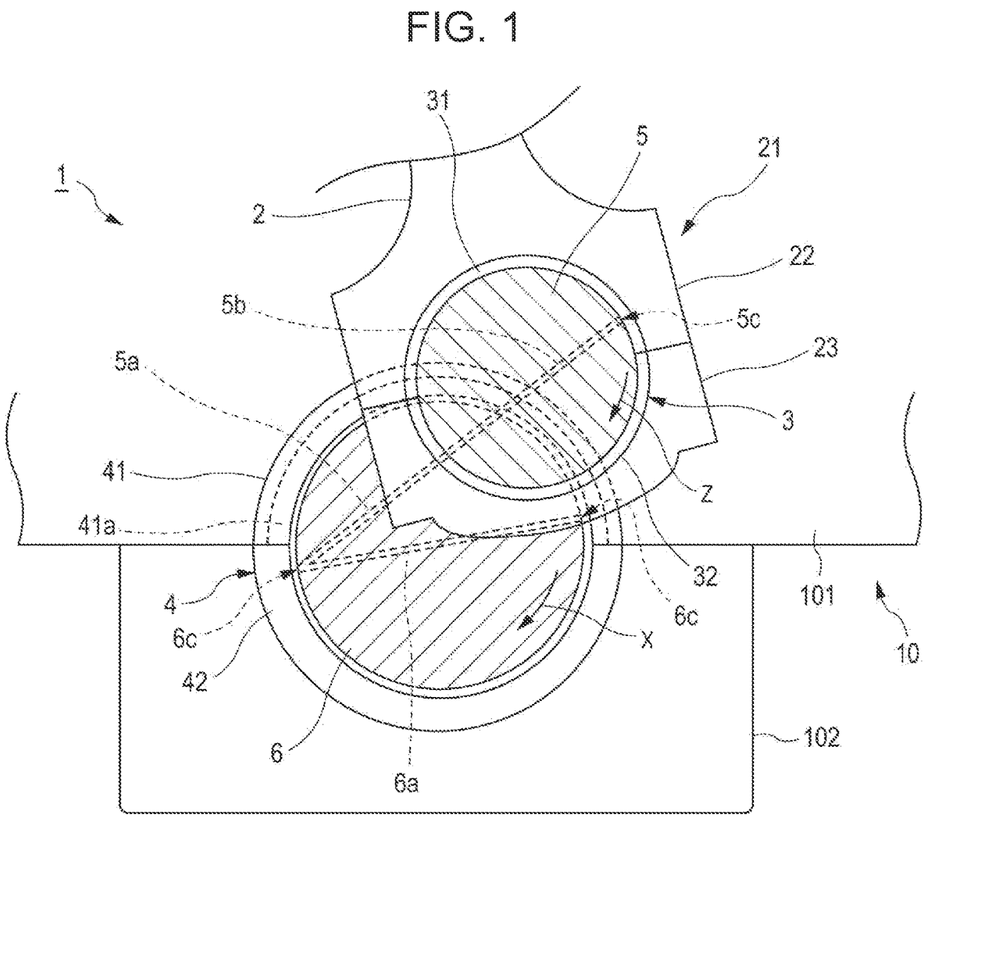
FIG. 1 is an overview diagram illustrating a bearing device of a crankshaft.

FIG. 1 schematically illustrates a bearing device 1 of an internal combustion engine. The bearing device 1 includes journal portions 6 that are supported at a lower portion of a cylinder block, crank pins 5 that are formed integrally with the journal portions 6 and rotate about the journal portions 6, and a conrod 2 that transmits reciprocation from the internal combustion engine to the crank pins 5. Also, the bearing device 1 further includes, as sliding bearings that support the crankshaft, a main bearing 4 that rotatably supports the journal portions 6 and a conrod bearing 3 that rotatably supports the crank pins 5.

Note that although the crankshaft includes a plurality of journal portions 6 and a plurality of crankpins 5, one journal portion 6 and one crank pin 5 will be illustrated and described here for convenience of explanation. In regard to the positional relationship in the paper surface depth direction in FIG. 1, the journal portion 6 is illustrated on the further side, and the crank pin 5 is illustrated on the closer side in the paper surface.

The journal portion 6 is axially supported by a bearing housing 10 (a cylinder block 101 and a cap 102) at a cylinder block lower portion of the internal combustion engine via the main bearing 4 constituted by a pair of half bearings 41 and 42. An oil groove 41a is formed in the half bearing 41 on the upper side of FIG. 1 over the entire length of the inner circumferential surface. Also, the journal portion 6 includes a lubricant path 6a penetrating in the diameter direction, and when the journal portion 6 rotates in the direction of the arrow X, inlet openings 6c at both ends of the lubricant path 6a alternately communicate with the oil groove 41a of the main bearing 4.

The crank pin 5 is axially supported by a bearing housing 21 (a rod-side large end portion housing 22 and a cap-side large end portion housing 23) of the conrod 2 via the conrod bearing 3 constituted by a pair of half bearings 31 and 32.

The bearing housing 10 is constituted by a pair of housing split bodies 101 and 102. The housing split bodies 101 and 102 have semi-cylindrical surfaces 27, and the semi-cylindrical surfaces 27 form a bearing holding hole 26 with a cylindrical shape when split surfaces 25 of the pair of housing split bodies 101 and 102 are caused to abut each other. The half bearings 41 and 42 are held by the semi-cylindrical surfaces 27.

Similarly, the bearing housing 21 is constituted by a pair of housing split bodies 22 and 23. The housing split bodies 22 and 23 have semi-cylindrical surfaces 27, and the semi-cylindrical surfaces 27 form the bearing holding hole 26 with a cylindrical shape when split surfaces 25 of the pair of housing split bodies 22 and 23 are caused to abut each other. The half bearings 31 and 32 are held by the semi-cylindrical surfaces 27.

As described above, a lubricant ejected by an oil pump to the main bearing 4 is fed from an oil gallery formed in the cylinder block wall into the oil groove 41a formed along the inner circumferential surface of the main bearing 4 through a through-hole formed in a wall of the main bearing 4.

Further, a first lubricant path 6a is formed to penetrate in a diameter direction of the journal portion 6 such that the inlet openings 6c of the first lubricant path 6a can communicate with the lubricant groove 41a, and a second lubricant path 5a branching from the first lubricant path 6a of the journal portion 6 and passing through a crank arm portion (not illustrated) is formed such that the second lubricant path 5a communicates with a third lubricant path 5b formed to penetrate in the diameter direction of the crank pin 5.

In this manner, the lubricant is supplied from an ejection port 5c at an end portion of the third lubricant path 5b to a clearance formed between the crank pin 5 and the conrod bearing 3 via the first lubricant path 6a, the second lubricant path 5a, and the third lubricant path 5b.

Figure 7:
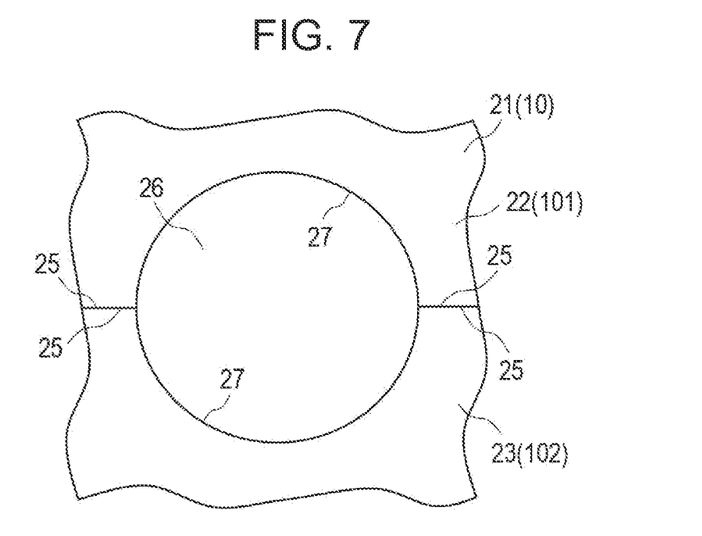
FIG. 7 is a diagram illustrating a bearing housing.
Figure 8:
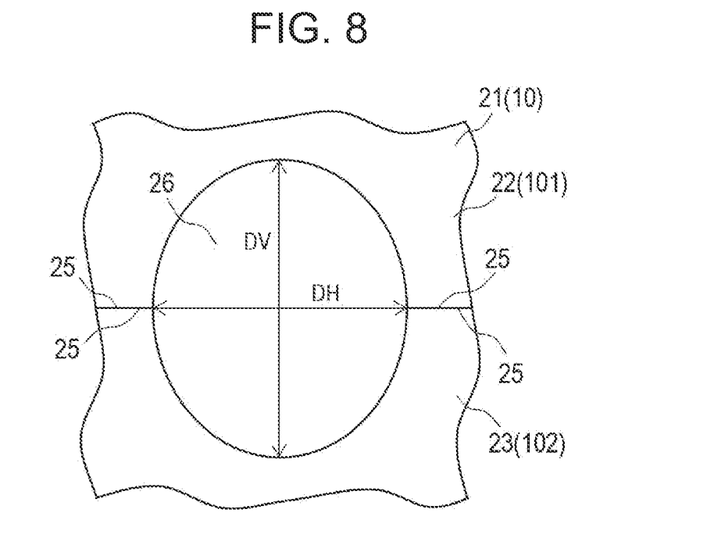
FIG. 8 is a diagram illustrating the bearing housing at the time of elastic deformation.

In internal combustion engines in recent years, there is a trend that rigidity of bearing housing portions such as conrods 2 and engine blocks 101 is degraded due to weight reduction for the purpose of low fuel consumption. Therefore, a phenomenon (close-in phenomenon) that the bearing holding hole 26 of the bearing housing 10; 21 with a cylindrical shape repeats elastic deformation in which an inner diameter DV in the vertical direction becomes greater than an inner diameter DH in the horizontal direction (see FIG. 8) and elastic deformation in which the bearing holding hole 26 returns to the cylindrical shape (see FIG. 7) due to an inertial force applied to the bearing housing 10; 21 and a dynamic load from the crankshaft during an operation of the internal combustion engine occurs. Here, the horizontal direction indicates a direction connecting both split surfaces 25 of the housing split bodies 101, 102; 22, 23 of the bearing housing 10; 21 when seen from the axial direction of the bearing holding hole 26. Also, the vertical direction indicates a direction that perpendicularly intersects the direction connecting both split surfaces 25 of the housing split bodies 101, 102; 22, 23 of the bearing housing 10; 21 when seen from the axial direction of the bearing holding hole 26.

When the inner diameter of the bearing holding hole 26 of the bearing housing 10; 21 increases in the vertical direction, a clearance may be instantaneously be formed between the split surfaces 25 of the pair of housing split bodies 101, 102; 22, 23 of the bearing housing 10; 21. When the split surfaces 25 of the housing split bodies 101, 102; 22, 23 are brought into contact with each other again, circumferential-direction end surfaces 76 of the half bearings 41, 42; 31, 32 held by each of the housing split bodies 101, 102; 22, 23 strongly push each other, and a large load is applied near the circumferential-direction end surfaces 76 of the half bearings 41, 42; 31, 32.

Figure 10:
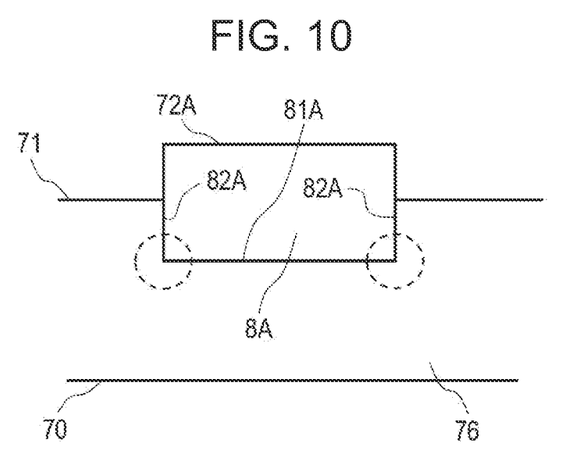
FIG. 10 is a diagram of a recessed portion in the related art.

A half bearing in the related art includes a protrusion 72A projecting outward in the radial direction from an outer circumferential surface 71 near the circumferential-direction end surface 76. A recessed portion 8A with a rectangular sectional shape recessed inward in the radial direction from the outer circumferential surface 71 is formed between the protrusion 72A and the circumferential-direction end surface 76. A groove (recessed portion) extending in the circumferential direction from a circumferential-direction end portion of the semi-cylindrical surface is formed in the bearing holding hole (semi-cylindrical surface) of the housing split body. The half bearing is adapted to be disposed at a determined position in the axial direction in the bearing holding hole by the protrusion 72A of the half bearing being accommodated in the groove of the bearing holding hole (see JP-A-59-50226, JP-A-2019-190551, and JP-A-2013-11333, for example).

FIG. 10 illustrates the protrusion 72A and the recessed portion 8A with a rectangular sectional shape of the half bearing in the related art when seen from the direction orthogonal to the circumferential-direction end surface 76. If a close-in phenomenon occurs in the bearing housing 10; 21, the circumferential-direction end surfaces 76 of the half bearings strongly push each other, and a large load is applied near the circumferential-direction end surfaces 76 of the half bearings, then a stress may concentrate on corner portions (see the circles of the dashed lines in FIG. 10) formed by the recessed portion bottom surface 81a and the recessed portion side surface 82A of the recessed portion 8A of the half bearing in the related art, and damage (cracking) is likely to occur at the corner.

The present invention is for addressing such a problem in the related art.

Hereinafter, an example in which the half bearing according to the present invention is applied to the conrod bearing 3 will be described. However, the present invention can be applied to a half bearing constituting not only the conrod bearing 3 but also the main bearing 4.

Both half bearing of the pair of half bearings constituting the conrod bearing 3 or the main bearing 4 can be the half bearings according to the present invention. Alternatively, one of the half bearings may be the half bearing according to the present invention, while the other may be the half bearing in the related art that does not include the protrusion and the recessed portion in the outer circumferential surface.

Figure 2:
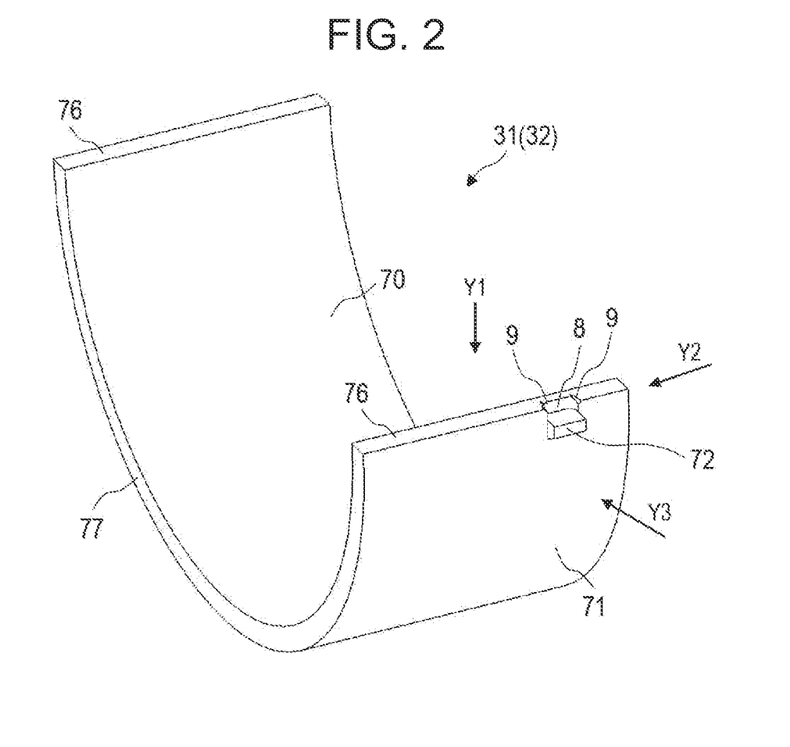
FIG. 2 is a perspective view of a half bearing according to a specific example of the present invention.

FIG. 2 illustrates a specific example of the half bearing (conrod bearing 3) according to the present invention. The conrod bearing 3 is formed by causing the circumferential-direction end surfaces 76 of the pair of half bearings 31 and 32 to abut each other and combining them into a cylindrical shape as a whole. The surface forming the inner circumferential surface 70 of the cylindrical shape is a sliding surface.

Note that the thickness of the half bearings 31 and 32 is constant in the circumferential direction. However, the thickness may become the maximum at the center portion in the circumferential direction and successively decrease toward the sides of both end surfaces 76 in the circumferential direction. Also, the inner circumferential surface 70 may include crash reliefs at both end portions in the circumferential direction.

Note that the crash reliefs are surfaces formed by reducing the thickness of the wall portion in circumferential-direction end portion regions of the half bearings 31 and 32 in the radial direction from the original inner circumferential surface 70, and these are formed to absorb positional deviation and deformation of the circumferential-direction end surfaces 76 of the half bearings occurring when the pair of half bearings 31 and 32 are assembled with the conrod 2, for example Therefore, the curvature center position of the surfaces of the crash reliefs is different from the curvature center position of the inner circumferential surface 70 in the other region (see SAE J506 (Item 3.26 and Item 6.4), DIN1497, Section 3.2, JIS D3102). In general, in a case of a bearing for a small-sized internal combustion engine for a passenger car, the depth of the crash reliefs in the circumferential-direction end surfaces of the half bearings (the distance from the original inner circumferential surface to the crash reliefs in the circumferential-direction end surface 76) is about 0.01 to 0.05 mm.

Figure 2A:
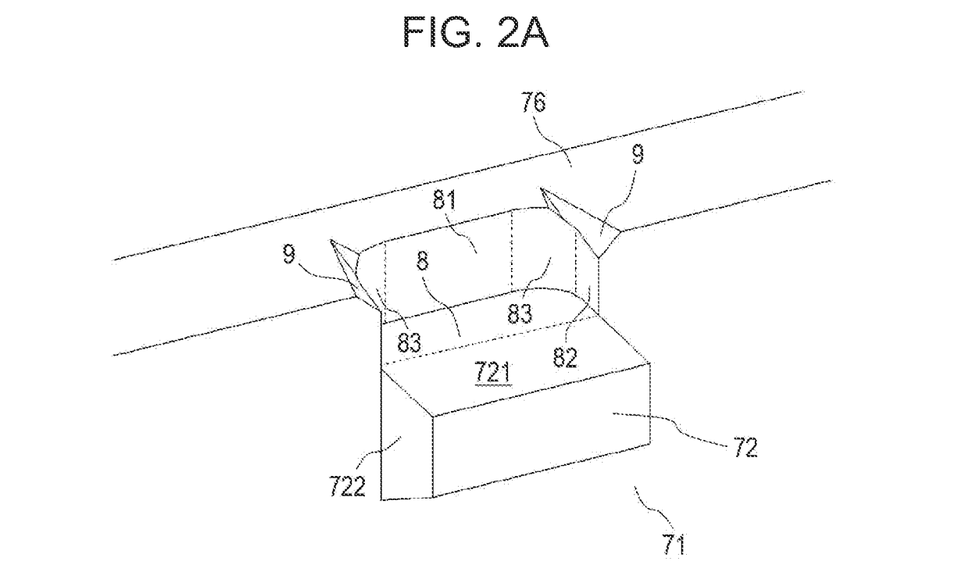
FIG. 2A is a perspective view of a protrusion, a recessed portion, and a radial-direction groove according to an embodiment of the present invention.
Figure 3:
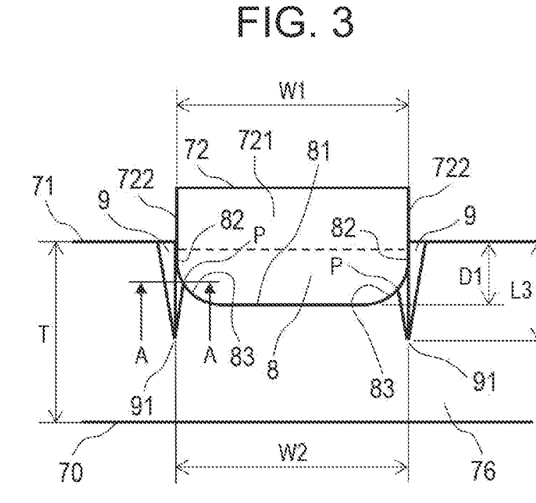
FIG. 3 is a diagram of the protrusion, the recessed portion, and the radial-direction grooves according to the embodiment of the present invention when seen from a direction orthogonal to a circumferential-direction end surface (the direction of the arrow Y1 in FIG. 2)
Figure 4:
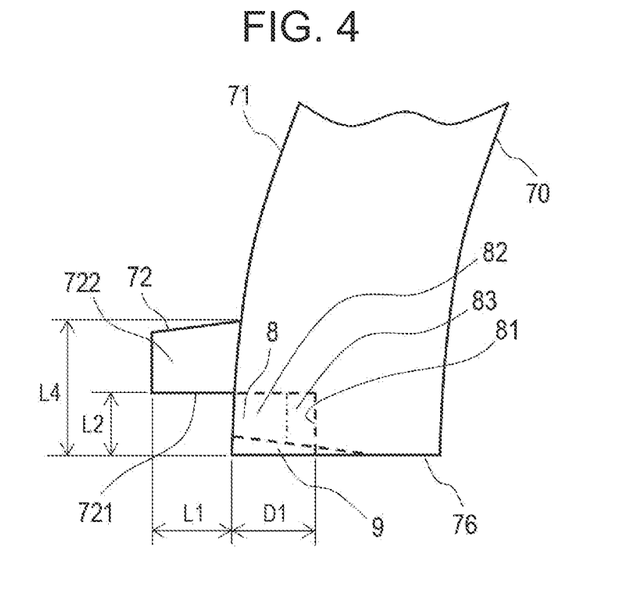
FIG. 4 is a diagram of the protrusion, the recessed portion, and a radial-direction grooves according to the embodiment of the present invention when seen from an axial direction (the direction of the arrow Y2 in FIG. 2)
Figure 5:
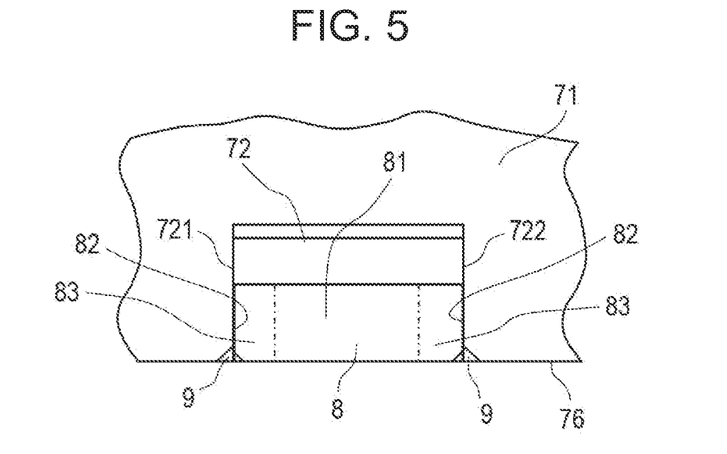
FIG. 5 is a diagram of the protrusion, the recessed portion, and the radial-direction grooves according to the embodiment of the present invention when seen from the side of an outer circumferential surface (the direction of the arrow Y3 in FIG. 2)

FIG. 2A is a perspective view of a protrusion, a recessed portion, and a radial-direction groove according to an embodiment of the present invention. FIG. 3 is a diagram of the protrusion, the recessed portion, and the radial-direction grooves when seen from the direction orthogonal to the circumferential-direction end surface 76 (the direction of the arrow Y1 in FIG. 2). FIG. 4 is a diagram of the protrusion, the recessed portion, and the radial-direction grooves when seen from the axial direction (the direction of the arrow Y2 in FIG. 2). FIG. 5 is a diagram of the protrusion, the recessed portion, and the radial-direction grooves according to the embodiment of the present invention when seen from the side of the outer circumferential surface (the direction of the arrow Y3 in FIG. 2). It is a matter of course that the present invention is not limited to this embodiment. Note that the protrusion 72, the recessed portion 8, and the radial-direction groove 9 are illustrated in an exaggerated manner in each drawing for easy understanding.

The half bearings 31 and 32 include at least one protrusion 72, and the protrusion 72 projects outward in the radial direction from the outer circumferential surface 71 on the side of one of the circumferential-direction end surfaces 76. The protrusion 72 is formed between both end surfaces 77 and 77 of the half bearings 31 and 32 in the axial direction. However, the protrusion 72 is not formed in contact with the axial-direction end surface 77. In other words, the protrusion 72 is formed at a space from the axial-direction end surface 77. The protrusion 72 includes a protrusion side surfaces 722 that is parallel with the circumferential direction of the half bearings 31 and 32 at both end portions in the width direction (the axial direction of the half bearings 31 and 32). Also, the protrusion 72 includes a protrusion circumferential-direction surface 721 that is parallel with the circumferential-direction end surfaces 76 of the half bearings 31 and 32 at a circumferential-direction end portion of the half bearings 31 and 32 on the side of the circumferential-direction end surfaces 76.

Note that the protrusion side surfaces 722 may be inclined relative to the circumferential direction of the half bearings 31 and 32. Also, the protrusion circumferential-direction surface 721 may be inclined relative to the circumferential-direction end surfaces 76 of the half bearings 31 and 32.

Note that one protrusion 72 and one recessed portion 8 are provided only on the side of one of the circumferential-direction end surfaces of the half bearings 31 and 32 in the present embodiment. However, the present invention is not limited thereto, and one or more protrusions 72 and recessed portions 8 may be provided on the side of each of the circumferential-direction end surfaces of the half bearings 31 and 32.

In the case of the small-sized internal combustion engine for a passenger vehicle, the width W1 of the protrusion 72 is 1.5 to 5.5 mm, and the height L1 of the protrusion 72 is 0.5 to 3 mm. Note that the height L1 of the protrusion 72 is defined as a length in the radial direction between the outer circumferential surfaces 71 of the circumferential-direction end surface 76 of the half bearings 31 and 32 and the furthest position of the protrusion 72 in the radial direction (see FIG. 4). The length L4 in the direction orthogonal to the circumferential-direction end surfaces 76 between the circumferential-direction end surfaces 76 of the half bearings 31 and 32 and the end portion of the protrusion 72 on the circumferential-direction center portion side of the half bearings 31 and 32 is 2 to 7 mm. Note that the protrusion 72 is not limited to the above dimension and may have another dimension.

The recessed portion 8 recessed inward in the radial direction from the outer circumferential surface 71 is formed over the entire circumferential-direction length between the protrusion 72 (protrusion circumferential-direction surface 721) and the circumferential-direction end surfaces 76 of the half bearings 31 and 32. The recessed portion 8 includes a recessed portion bottom surface 81 that is parallel with the axial direction of the half bearings 31 and 32 when seen in a section that is parallel with the circumferential-direction end surfaces 76, two recessed portion side surfaces 82 that perpendicularly intersect the axial direction of the half bearings 31 and 32 at both ends of the recessed portion 8 in the axial direction of the half bearings 31 and 32, and two recessed portion curved surfaces 83 (curved surfaces with a shape projecting toward the inner diameter side of the half bearings 31 and 32) connecting each of the recessed portion side surfaces 82 to the recessed portion bottom surface 81. Also, the recessed portion 8 is opened in the circumferential-direction end surfaces 76 of the half bearings 31 and 32.

The recessed portion bottom surface 81, the recessed portion side surfaces 82, and the recessed portion curved surfaces 83 of the recessed portion 8 extend in the direction orthogonal to the circumferential-direction end surfaces 76 of the half bearings 31 and 32. The end surface of the recessed portion 8 on the side of the protrusion 72 is in the same plane as that of the protrusion circumferential-direction surface 721. In FIG. 3, the dotted and dashed line illustrates the position of the outer circumferential surface 71 in the protrusion circumferential-direction surface 721 in a case in which the outer circumferential surface 71 in the protrusion circumferential-direction surface 721 is assumed to be present in the protrusion 72 as well. In FIG. 3, the surface surrounded by the dotted and dashed line, the recessed portion bottom surface 81, the recessed portion side surfaces 82, and the recessed portion curved surfaces 83 is the end surface of the recessed portion 8 on the side of the protrusion 72.

The width W2 of the recessed portion 8 is set to be the same as the width W1 of the protrusion 72. The width W2 of the recessed portion 8 may be slightly smaller than the width W1 of the protrusion 72. In the case of the small-sized internal combustion engine for a passenger car, the length L2 of the recessed portion 8 is 0.5 to 3 mm, the depth D1 of the recessed portion is 0.3 to 2 mm (however, the depth D1 of the recessed portion 8 is equal to or less than 60% of the thickness T at the circumferential-direction end surfaces 76 of the half bearings 31 and 32 ($D1 \leq T \times 0.6$). The length L2 of the recessed portion 8 is defined as a length in the direction orthogonal to the circumferential-direction end surface 76 between the circumferential-direction end surfaces 76 of the half bearings 31 and 32 and the end surface of the recessed portion 8 on the side of the protrusion 72 (see FIG. 4). The depth D1 of the recessed portion is defined as a length in the radial direction between the outer circumferential surface 71 in the circumferential-direction end surfaces 76 of the half bearings 31 and 32 and the recessed portion bottom surface 81 (see FIG. 4). Note that the recessed portion 8 is not limited to the aforementioned dimension and may have another dimension.

The two radial-direction grooves 9 are formed in the circumferential-direction end surfaces 76 of the half bearings 31 and 32 relative to the protrusion 72. Each of the two radial-direction grooves 9 are adjacent to each of the recessed portion side surfaces 82. The radial-direction grooves 9 extend in the radial direction along the recessed portion side surface 82 from the outer circumferential surface 71 toward the inner circumferential surface 70 of the half bearings 31 and 32. Note that in a case in which two or more protrusions 72 are provided in the half bearings 31 and 32, two radial-direction grooves 9 are formed in the circumferential-direction end surfaces 76 of the half bearings 31 and 32 for each protrusion 72. The extension length L3 of the radial-direction groove 9 is greater than the depth D1 of the recessed portion 8. The radial-direction groove 9 is separated from the recessed portion 8 (recessed portion curved surfaces 83) at a midpoint of the extension. An inner circumferential surface-side end portion 91 in the extending direction of the radial-direction groove 9 is located between the recessed portion bottom surface 81 and the inner circumferential surface 70 of the half bearings 31 and 32.

Figure 6:
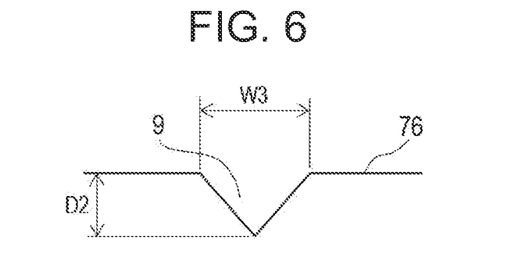
FIG. 6 is a diagram of the radial-direction groove at a position separated from the recessed portion when seen in a section of the half bearing in the axial direction.

The groove depth of the radial-direction grooves 9 decreases from the outer circumferential surface 71 toward a position P separated from the recessed portion 8 (recessed portion curved surfaces 83). Also, the groove width W3 and the groove depth D2 of the radial-direction grooves 9 decreases from the position P separated from the recessed portion 8 (recessed portion curved surfaces 83) toward the inner circumferential surface-side end portion 91 and reach zero at the inner circumferential surface-side end portion 91. FIG. 6 is a diagram of the radial-direction groove 9 at the position P (the portion A-A in FIG. 3) separated from the recessed portion 8 when seen in the section of the axial direction of the half bearings 31 and 32. Although the sectional shape of the radial-direction groove 9 is a V shape in the present embodiment, the sectional shape may be a R shape. Also, the extending direction of the radial-direction groove 9 may be inclined relative to the radial direction of the half bearings 31 and 32.

In the case of the small-sized internal combustion engine for a passenger vehicle, the groove depth D2 of the radial-direction groove 9 at the position P separated from the recessed portion 8 can be 0.03 to 0.15 mm. The groove width W3 of the radial-direction groove 9 at the position P separated from the recessed portion 8 can be 0.1 to 0.3 mm. Also, the extension length L3 of the radial-direction groove 9 can be greater than the depth D1 of the recessed portion 8 by 0.05 to 0.8 mm. However, the extension length L3 of the radial-direction groove 9 is preferably less than 75% of the thickness (wall thickness) T at the circumferential-direction end surface 76 of the half bearing. In other words, it is preferable that circumferential-direction end surface of equal to or greater than 25% of the thickness T of the half bearing be secured between the inner circumferential surface-side end portion 91 and the inner circumferential surface 70 without formation of the radial-direction groove.

Note that the groove depth D2 of the radial-direction groove 9 at the position P separated from the recessed portion 8 is defined as a length in the direction orthogonal to the circumferential-direction end surface 76 from the circumferential-direction end surface 76 to the deepest position of the radial-direction groove 9. The groove width W3 of the radial-direction groove 9 at the position P separated from the recessed portion 8 is defined as a length in the direction, which is parallel with the axial direction of the half bearings 31 and 32, of the radial-direction groove 9 at the circumferential-direction end surface 76. The extension length L3 of the radial-direction groove 9 is defined as a length in the radial direction between the outer circumferential surface 71 in the circumferential-direction end surface 76 and the inner circumferential surface-side end portion 91 of the radial-direction groove 9. Note that the radial-direction groove 9 is not limited to the aforementioned dimension and may have another dimension.

The conrod bearing 3 according to the present embodiment is formed by causing the circumferential-direction end surfaces 76 of the pair of half bearings 31 and 32 to abut each other and combining them into a cylindrical shape as a whole. In a case in which the protrusion 72 and the recessed portion 8 are formed only on a side of one of the circumferential-direction end surface 76, the pair of half bearings 31 and 32 are generally combined by causing the circumferential-direction end surfaces 76 where the protrusion 72 and the recessed portion 8 are formed to abut each other. At this time, the recessed portion 8 of the circumferential-direction end surface 76 of one half bearing 31 (32) is not in contact with the recessed portion 8 of the circumferential-direction end surface 76 of the other half bearing 32 (31) (in contact with the circumferential-direction end surface 76 at a location where the recessed portion 8 is not formed). The half bearings 31 and 32 can include sliding layers made of a Cu bearing alloy or an Al bearing alloy. Alternatively, the half bearings 31 and 32 can have sliding layers made of a Cu bearing alloy or an Al bearing alloy on a back metal layer made of an Fe alloy. Also, the sliding surface that is the inner circumferential surface 70 with the cylindrical shape and the outer circumferential surface 71 may have surface portions made of any one of Bi, Sn and Pb that are softer than the bearing alloys or an alloy containing such metal as a main constituent or a surface portion made of a resin composition containing a synthetic resin as a main constituent.

The reason that damage (cracking) becomes less likely to occur near the recessed portion 8 in the circumferential-direction end surfaces 76 owing to the half bearings 31 and 32 according to the present invention as described above will be described below.

If a close-in phenomenon occurs in the bearing housing 21 during an operation of the internal combustion engine, the circumferential-direction end surfaces 76 of the half bearings 31 and 32 strongly push each other as described above. However, since the recessed portion 8 according to the present invention has the recessed portion curved surfaces 83 between the recessed portion bottom surface 81 and the recessed portion side surfaces 82, locations where a stress may concentrate like corner portions in the related art are not formed, and the stress is distributed to the entire recessed portion curved surfaces 83. Further, the bearing material near the recessed portion curved surfaces 83 is elastically deformed toward spaces generated by the radial-direction grooves 9 due to a load applied near the recessed portion curved surfaces 83, and a stress applied to the bearing material near the recessed portion curved surfaces 83 is thus alleviated.

Figure 9:
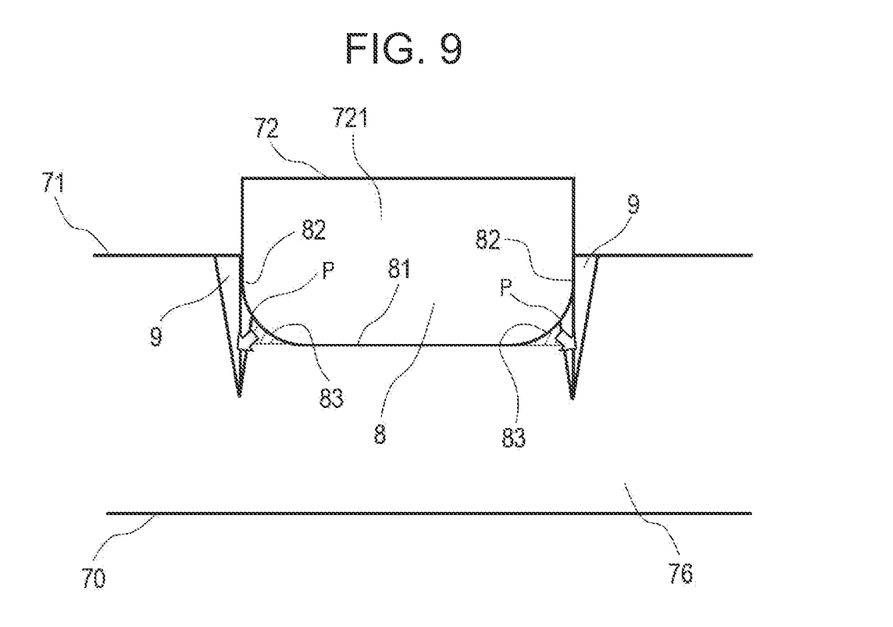
FIG. 9 is a diagram for explaining actions of the present invention.

Specifically, when a load is applied near the recessed portion curved surfaces 83, the bearing material (see the hatched portion with the substantially triangular shape in FIG. 9) near the circumferential-direction end surface at the portion surrounded by the position P at which the radial-direction grooves 9 are separated from the recessed portion curved surfaces 83, the radial-direction grooves 9, the recessed portion bottom surface 81, and the recessed portion curved surfaces 83 is elastically deformed toward the spaces generated by the radial-direction grooves 9 (the directions of the outlined arrows in FIG. 9), and a stress applied to the bearing material of the recessed portion curved surfaces 83 is thus reduced. Therefore, damage becomes less likely to occur near the recessed portion of the circumferential-direction end surface of the half bearings 31 and 32.

Figure 11:
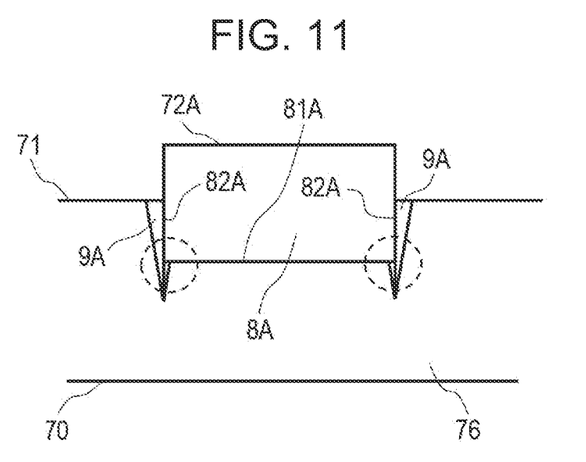
FIG. 11 is a diagram of a recessed portion according to a comparative example.

FIG. 11 is a diagram near a recessed portion 8A in a circumferential-direction end surface of a half bearing according to a comparative example when seen in the direction orthogonal to the circumferential-direction end surface. The recessed portion 8A in the comparative example includes radial-direction grooves 9A, a recessed portion bottom surface 81A and recessed portion side surfaces 82A of the recessed portion 8A are connected directly to each other, and the recessed portion curved surfaces 83 are not included. Therefore, if a close-in phenomenon occurs in the bearing housing 21, the circumferential-direction end surfaces 76 of the half bearings strongly push each other, and a large load is applied near the circumferential-direction end surfaces 76 of the half bearings, a stress may concentrate on corner portions (see the circles of the dashed lines in FIG. 11) formed by the recessed portion bottom surface 81A and the recessed portion side surfaces 82A in the recessed portion 8A, and damage is likely to occur at the corner portions.

Figure 12:
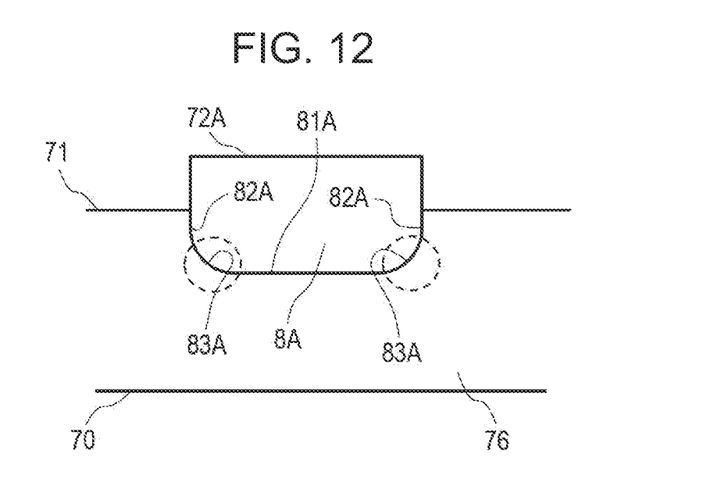
FIG. 12 is a diagram of a recessed portion according to another comparative example.

FIG. 12 is a diagram near a recessed portion 8A in a circumferential-direction end surface of a half bearing according to another comparative example when seen in the direction orthogonal to the circumferential-direction end surface. The recessed portion 8A in the comparative example includes recessed portion curved surfaces 83A between a recessed portion bottom surface 81A and the recessed portion side surfaces 82A of the recessed portion 8A but does not include the radial-direction grooves 9. Therefore, when a close-in phenomenon occurs in the bearing housing 21, the circumferential-direction end surfaces 76 of the half bearings strongly push each other, and a large load is applied near the circumferential-direction end surfaces 76 of the half bearings, the action in which the bearing material near the recessed portion curved surfaces 83A is elastically deformed toward the spaces generated by the radial-direction grooves 9 cannot be obtained, a stress may thus concentrate on the recessed portion curved surface 83A (see the circles of the dashed line in FIG. 12), and damage is likely to occur in the recessed portion curved surfaces 83A.

Figure 13:
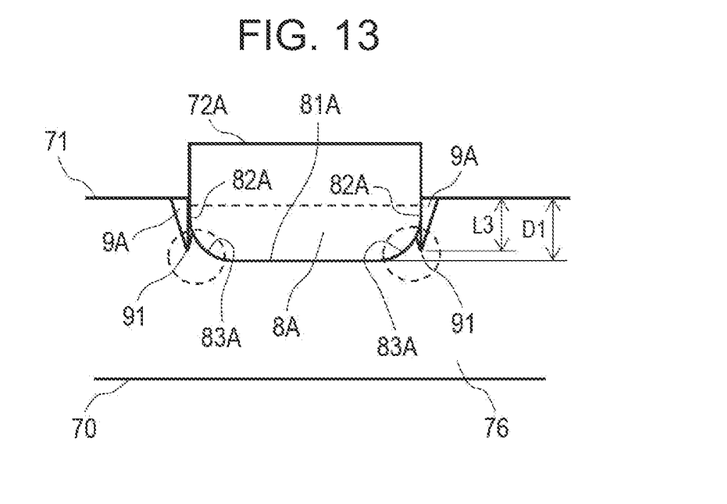
FIG. 13 is a diagram of a recessed portion according to another comparative example.

FIG. 13 is a diagram near a recessed portion 8A in a circumferential-direction end surface of half bearings according to another comparative example when seen in the direction orthogonal to the circumferential-direction end surface. The recessed portion 8A in the comparative example includes recessed portion curved surfaces 83A between the recessed portion bottom surface 81A and the recessed portion side surfaces 82A of the recessed portion 8A and includes two radial-direction grooves 9A. However, the extension length L3 of the radial-direction grooves 9A is smaller than the depth D1 of the recessed portion 8A. Therefore, when a close-in phenomenon occurs in the bearing housing 21, the circumferential-direction end surfaces 76 of the half bearings strongly push each other, and a large load is applied near the circumferential-direction end surfaces 76 of the half bearings, the action in which the bearing material near the curved surfaces 83A is elastically deformed toward the spaces generated by the radial-direction grooves 9A is insufficient or cannot be obtained at all, a stress may concentrate on the curved surfaces 83A (see the circles of the dashed lines in FIG. 13), and damage is likely to occur in the curved surfaces 83A.

Figure 14:
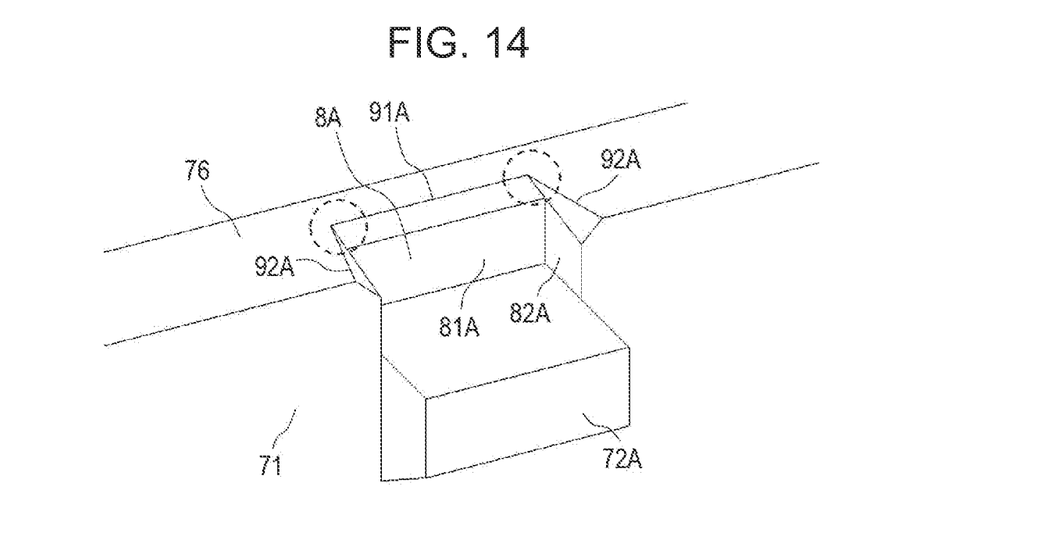
FIG. 14 is a diagram of a recessed portion according to another comparative example.

FIG. 14 illustrates a perspective view near a recessed portion 8A in the circumferential-direction end surface of a half bearing according to another comparative example. The recessed portion 8A in the comparative example does not include the recessed portion curved surface 83 with the recessed portion bottom surface 81A and the recessed portion side surfaces 82A of the recessed portion 8A connected directly to each other. Also, one radial-direction groove 9A is present, the radial-direction groove 9A has a wider width than the width of the recessed portion 8A and has a trapezoidal section. The groove width and the groove depth of the radial-direction groove 9A are the maximum at the outer circumferential surface and decrease toward the side of the inner circumferential surface. The radial-direction groove 9A has an end portion 91A that is parallel with the axial direction of the half bearings at the end portion on the side of the inner circumferential surface. According to the half bearing in the comparative example, when a close-in phenomenon occurs in the bearing housing 21, the circumferential-direction end surfaces 76 of the half bearings strongly push each other, and a large load is applied near the circumferential-direction end surfaces 76 of the half bearings, a stress may concentrate on the corner portion formed by the recessed surface bottom surface 81A and the recessed portion side surface 82A, and damage is likely to occur at the corner portions. Furthermore, a stress may also concentrate on the corner portions at which the end portion 91A of the radial-direction groove 9A on the side of the inner circumferential surface and the end surfaces 92A of the radial-direction groove 9A in the width direction (see the circles of the dashed lines in FIG. 14), and damage is likely to occur.

Although the example in which the half bearing according to the present invention is applied to the conrod bearing that supports a crank pin of a crankshaft of an internal combustion engine has been described above, the half bearing according to the present invention can be applied to one or both of a pair of half bearings constituting a main bearing that supports a journal portion of a crankshaft. Also, the half bearing may have an oil hole or an oil groove.

The invention claimed is:

1. A half bearing constituting a sliding bearing that supports a crankshaft of an internal combustion engine, the half bearing having a semi-cylindrical shape and including an inner circumferential surface and an outer circumferential surface, the half bearing comprising:
at least one protrusion, the protrusion projecting outward in a radial direction from the outer circumferential surface,
wherein a recessed portion recessed inward in the radial direction from the outer circumferential surface is formed over an entire circumferential-direction length between the protrusion and a circumferential-direction end surface of the half bearing,
the protrusion is located between both end surfaces of the half bearing in an axial direction,
the recessed portion includes a recessed portion bottom surface that is parallel with the axial direction of the half bearing when seen in a section that is parallel with the circumferential-direction end surface, two recessed portion side surfaces that perpendicularly intersect the axial direction of the half bearing at both ends of the recessed portion in the axial direction of the half bearing, and two recessed portion curved surfaces that connect the recessed portion side surfaces to the recessed portion bottom surface, two radial-direction grooves are formed in the circumferential-direction end surface of the half bearing relative to the protrusion, each of the two radial-direction grooves being adjacent to each of the recessed portion side surfaces, an extension length of the radial-direction grooves is greater than a depth of the recessed portion, the radial-direction grooves extend in the radial direction along the recessed portion side surfaces from the outer circumferential surface toward the inner circumferential surface of the half bearing, the radial-direction grooves being separated from the recessed portion at a midpoint of the extension, an inner circumferential surface-side end portion in an extending direction of the radial-direction grooves is located between the recessed portion bottom surface and the inner circumferential surface of the half bearing, and a groove width and a groove depth of the radial-direction grooves decrease from the position separated from the recessed portion toward the inner circumferential surface-side end portion and reach zero at the inner circumferential surface-side end portion.

2. The half bearing according to claim 1, wherein the groove depth of the radial-direction grooves at the position separated from the recessed portion is 0.03 to 0.15 mm.

3. The half bearing according to claim 1, wherein the groove width of the radial-direction grooves at the position separated from the recessed portion is 0.1 to 0.3 mm.

4. The half bearing according to claim 1, wherein the extension length of the radial-direction grooves is greater than the depth of the recessed portion by 0.05 to 0.8 mm.

5. A sliding bearing with a cylindrical shape that supports a crankshaft of an internal combustion engine, the sliding bearing comprising:

the half bearing according to claim 1.

6. The sliding bearing according to claim 5 which is configured by a combination of pairs of the half bearings.

* * * * *